United States Patent
Katsuta

(10) Patent No.: US 11,465,336 B2
(45) Date of Patent: Oct. 11, 2022

(54) MANUFACTURING APPARATUS

(71) Applicant: FUJIFILM BUSINESS INNOVATION CORP., Tokyo (JP)

(72) Inventor: Nobuhiro Katsuta, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 77 days.

(21) Appl. No.: 16/936,625

(22) Filed: Jul. 23, 2020

(65) Prior Publication Data
US 2021/0299945 A1  Sep. 30, 2021

(30) Foreign Application Priority Data

Mar. 24, 2020 (JP) .............................. JP2020-053317

(51) Int. Cl.
| | |
|---|---|
| B29C 64/118 | (2017.01) |
| B29C 64/295 | (2017.01) |
| B29C 64/321 | (2017.01) |
| B29C 64/343 | (2017.01) |
| B29C 64/393 | (2017.01) |
| B29C 64/245 | (2017.01) |
| B29C 64/205 | (2017.01) |
| B29C 64/314 | (2017.01) |
| B33Y 50/02 | (2015.01) |
| B33Y 30/00 | (2015.01) |

(52) U.S. Cl.
CPC .......... *B29C 64/118* (2017.08); *B29C 64/205* (2017.08); *B29C 64/245* (2017.08); *B29C 64/295* (2017.08); *B29C 64/314* (2017.08); *B29C 64/321* (2017.08); *B29C 64/343* (2017.08); *B29C 64/393* (2017.08); *B33Y 30/00* (2014.12); *B33Y 50/02* (2014.12)

(58) Field of Classification Search
CPC ... B29C 64/118; B29C 64/205; B29C 64/295; B29C 64/321; B29C 64/393; B29C 70/38; B29C 70/384
See application file for complete search history.

(56) References Cited

U.S. PATENT DOCUMENTS

| | | | |
|---|---|---|---|
| 2014/0291886 A1 | 10/2014 | Mark et al. | |
| 2014/0322383 A1* | 10/2014 | Rutter | B33Y 30/00 425/500 |
| 2014/0361460 A1* | 12/2014 | Mark | B29C 48/0022 264/248 |
| 2017/0022394 A1* | 1/2017 | Miller, II | C09J 5/00 |
| 2017/0028644 A1* | 2/2017 | Evans | B29C 64/393 |
| 2017/0157844 A1* | 6/2017 | Mandel | B29C 64/393 |
| 2017/0274585 A1* | 9/2017 | Armijo | B33Y 10/00 |
| 2018/0133980 A1* | 5/2018 | Mantell | B29C 48/05 |

FOREIGN PATENT DOCUMENTS

JP    2016-531020 A    10/2016

* cited by examiner

*Primary Examiner* — Joseph S Del Sole
*Assistant Examiner* — Mohamed K Ahmed Ali
(74) *Attorney, Agent, or Firm* — Oliff PLC

(57) ABSTRACT

A manufacturing apparatus includes: a table having a surface; a delivery unit including a heating unit that heats a filament, the delivery unit that delivers the filament toward the surface; a pressurizing unit disposed downstream of the delivery unit in a delivery direction of the filament, the pressuring unit that pressurizes the filament delivered to the surface against the surface; and a cutting unit that cuts the filament between the pressurizing unit and the heating unit in the delivery direction.

9 Claims, 8 Drawing Sheets

67d  FB4  FB3  FB2  FB1

67c

67b

67a

63

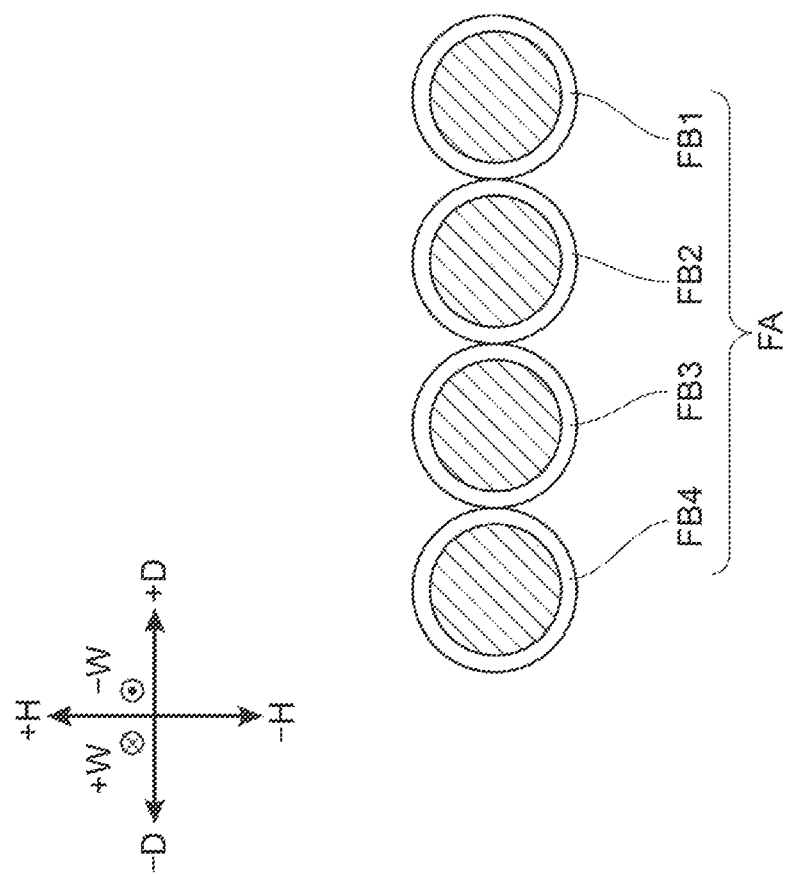

MANUFACTURING APPARATUS

CROSS-REFERENCE TO RELATED APPLICATIONS

This application is based on and claims priority under 35 USC 119 from Japanese Patent Application No. 2020-053317 filed Mar. 24, 2020.

BACKGROUND

1. Technical Field

Exemplary embodiments of the present disclosure relate to a manufacturing apparatus.

2. Related Art

JP-T-2016-531020 discloses a 3D printer for deposition modeling of components, the 3D printer including a fiber composite filament supply unit of an unmelted fiber reinforced composite filament that contains one or more inelastic axial fiber strands extending within a matrix material of the filament, a movable platen body that supports the above component, a print head that includes a composite filament shear tip facing the movable platen body and a heater that heats the composite filament shear tip to a temperature higher than the melting temperature of the matrix material, plural actuators that provide relative motion of the print head and the platen body with three degrees of freedom, a filament drive that introduces the unmelted fiber reinforced composite filament and the inelastic fiber strands embedded in the unmelted fiber reinforced composite filament into the print head at a certain linear transmission speed, a cooling transmission zone that is located between the filament drive and the shear tip and is maintained below the melting temperature of the matrix material, and a controller operably connected to the heater, the filament drive and the plural actuators. The controller causes the filament drive to execute an instruction of holding an unbonded trailing end of the composite filament in the cooling transmission zone between the filament drive and the shear tip.

SUMMARY

Aspects of non-limiting embodiments of the present disclosure relate to improving the dimensional accuracy of a manufactured object as compared with a configuration in which a filament is cut upstream of a heating unit in a delivery direction of a filament.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a manufacturing apparatus including: a table having a surface; a delivery unit including a heating unit that heats a filament, the delivery unit that delivers the filament toward the surface; a pressurizing unit disposed downstream of the delivery unit in a delivery direction of the filament, the pressurizing unit that pressurizes the filament delivered to the surface against the surface; and a cutting unit that cuts the filament between the pressurizing unit and the heating unit in the delivery direction.

BRIEF DESCRIPTION OF THE DRAWINGS

Exemplary embodiment(s) of the present disclosure will be described in detail based on the following figures, wherein:

FIG. 8 is a cross-sectional view of the parallel filament according to the exemplary embodiment.

DETAILED DESCRIPTION

An example of a manufacturing apparatus according to an exemplary embodiment of the present disclosure will be described with reference to the drawings.

In the following description, when the manufacturing apparatus 10 is viewed from the side where a user (not illustrated) stands, the apparatus vertical direction (vertical direction), the apparatus width direction (horizontal direction), and the apparatus depth direction (horizontal direction) are described as the H direction, the W direction, and the D direction, respectively. Further, when it is necessary to distinguish one side from the other side in the apparatus vertical direction, the apparatus width direction, and the apparatus depth direction, respectively, viewing the manufacturing apparatus 10 from the front, the upper side is described as the +H side, the lower side is described as the −H side, the right side is described as the +W side, the left side is described as the −W side, the back side is described as the −D side, and the front side is described as the +D side.

(Manufacturing Apparatus 10)

Figure 1:
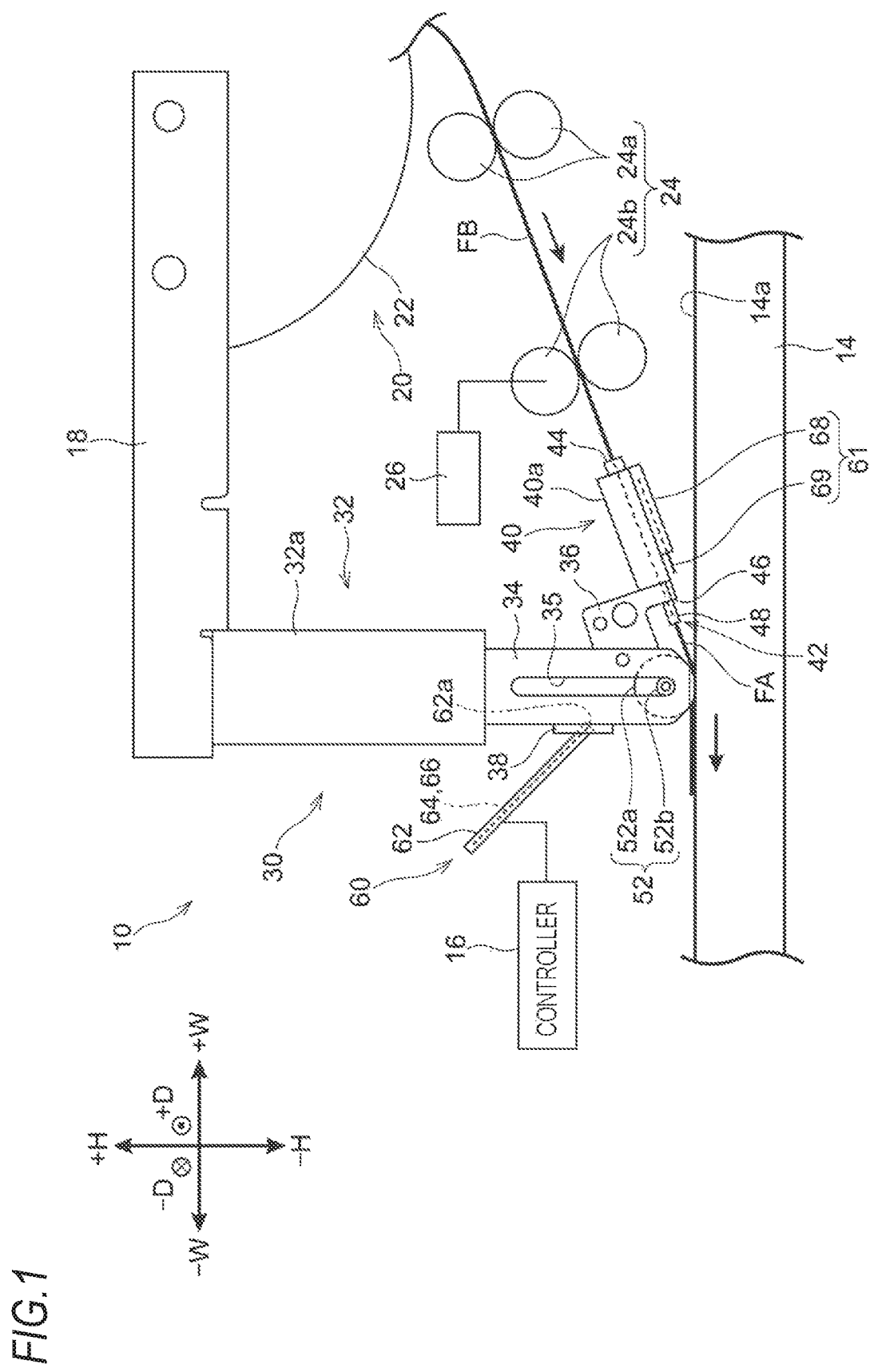
FIG. 1 is a schematic side view illustrating a manufacturing apparatus according to an exemplary embodiment.

The manufacturing apparatus 10 is a three-dimensional manufacturing apparatus (3D printer) of a fused deposition modeling (FDM) type that manufactures an object by stacking layers plural times according to layer data of plural layers. As illustrated in FIG. 1, the manufacturing apparatus 10 includes a manufacturing device 12, a table 14, and a moving device 18. An operation of each component of the manufacturing apparatus 10 is controlled by a controller 16 according to three-dimensional data of an object to be manufactured.

The table 14 is disposed in a lower region of the manufacturing apparatus 10, and has a surface 14a that is a horizontal surface facing upward.

The moving device 18 moves the manufacturing device 12 relatively to the table 14 according to manufacturing process data based on three-dimensional data of an object to be manufactured. That is, the manufacturing device 12 is moved along the surface 14*a* of the table 14 by the moving device 18 relatively to the surface 14*a*. Further, the manufacturing device 12 is moved along the stacking direction by the moving device 18 relatively to the surface 14*a*. In the exemplary embodiment, the moving device 18 is disposed above the table 14. The moving device 18 includes plural actuators that move the manufacturing device 12 in the apparatus width direction, the apparatus depth direction, and the apparatus vertical direction, and further rotate the manufacturing device 12 around the vertical direction as the axial direction. The moving device 18 may be configured to move the table 14 relative to the manufacturing device 12.

(Manufacturing Device)

The manufacturing device 12 is disposed between the table 14 and the moving device 18 in the apparatus vertical direction. The manufacturing device 12 delivers, as a manufacturing material, parallel filament FA, formed by juxtaposing four filaments FB (which will be described later) in the direction along the surface 14*a*, onto the surface 14*a* of the table 14 to form a layer, and stacks plural layers to manufacture a three-dimensional object. In the exemplary embodiment, the filaments FB forming the parallel filament FA are juxtaposed in the apparatus depth direction. The manufacturing device 12 includes a supply unit 20, a transport unit 24, and a stacking unit 30.

The supply unit 20 includes four reels 22 which are attached to, for example, the moving device 18, and around which the filaments FB are wound. The supply unit 20 supplies the filaments FB from the respective reels 22 to the stacking unit 30. The filament FB is formed by impregnating a fiber bundle with a resin. The fiber bundle is an example of a bundle of continuous fibers. The continuous fibers are, for example, carbon fibers having a diameter of 0.007 mm. The fiber bundle is formed, for example, by bundling 3000 carbon fibers in a circular shape having a diameter of 0.4 mm. In the exemplary embodiment, the reel 22 of the supply unit 20 is configured so be attachable to and detachable from the manufacturing apparatus 10 and to be replaceable with another reel around which the filament FB is wound. The four reels 22 are illustrated in a simplified manner, that is, illustrated as one reel in FIG. 1.

The transport unit 24 is disposed downstream of the supply unit 20 in the supply direction of the filaments FB. The transport unit 24 includes transport roller pairs arranged side by side in the juxtaposition direction of the filaments FB forming the parallel filament FA. A pair of transport rollers are roller members arranged vertically side by side in the apparatus depth direction as the axial direction. The transport unit 24 nips the filaments FB supplied from the supply unit 20 between the transport roller pairs, and transports the filaments FB toward the stacking unit 30. The transport direction of the filament FB by the transport unit 24 is inclined with respect to the surface 14*a* of the table 14. The transport direction of the filament FB in the exemplary embodiment is a direction inclined toward the −W side and the −H side with respect to the surface 14*a*. In the exemplary embodiment, the transport unit 24 has a configuration in which two sets of transport roller pairs are arranged side by side in the transport direction of the filament FB. Each set includes four pairs of transport rollers arranged side by side in the juxtaposition direction of the filaments FB to correspond to the respective filaments FB. The two sets of transport roller pairs are respectively upstream transport roller pairs 24*a* and downstream transport roller pairs 24*b* in order from the upstream side in the transport direction of the filament FB. Each of the upstream transport roller pairs 24*a* and the downstream transport roller pairs 24*b* is illustrated in a simplified manner, that is, illustrated as a pair of transport rollers in FIG. 1.

In addition, the transport unit 24 further includes four drive units 26 connected individually to the respective transport roller pairs constituting the downstream transport roller pairs 24*b*. The drive unit 26 includes, for example, a motor and the like, is connected to the upper roller member of the transport roller pair, and rotates the roller member around the apparatus depth direction. In the exemplary embodiment, when the drive unit 26 rotates the upper roller member of the transport roller pair clockwise as viewed from the front side, the filament FB is transported from the downstream transport roller pair 24*b* toward the stacking unit 30. The drive unit 26 may stop the transport of the filament FB by not rotating, that is, stopping, the upper roller member of the transport roller pair. Further, the drive unit 26 may rotate the upper roller member counterclockwise as viewed from the front side. The operation of the drive unit 26 is controlled by the controller 16. The four drive units 26 are illustrated in a simplified manner, that is, illustrated as one drive unit 26 in FIG. 1.

(Stacking Unit)

The stacking unit 30 is disposed downstream of the transport unit 24 in the transport direction of the filament FB. The stacking unit 30 juxtaposes the filaments FB transported from the transport unit 24 in the direction along the surface 14*a* to form the parallel filament FA and deliver the same to the surface 14*a*, thereby forming a layer of the parallel filament FA. The stacking unit 30 includes a support unit 32, a delivery unit 40, a pressurizing unit 50, and a cutting unit 60.

The support unit 32 is provided on the moving device 18, and is adapted to support the delivery unit 40, the pressurizing unit 50, and the cutting unit 60. The support unit 32 includes a base portion 32*a*, a first support 34, a second support 36, and a third support 38.

The base portion 32*a* is a rod-shaped member that extends downward from the moving device 18.

The first support 34 is configured with, for example, a pair of panel-shaped brackets that extend downward from a lower end of the base portion 32*a* and are arranged side by side in the apparatus depth direction, and supports a shaft 52*b* of the pressurizing unit 50 to be described later. A hole 35 is formed in each of the brackets of the first support 34 so as to penetrate the corresponding bracket in the plate thickness direction and to have a shape that extends in the apparatus vertical direction. Further, in the first support 34, the space sandwiched between the brackets serves as a passage space 31 in which the pressurizing unit 50 or the cutting unit 60 to be described later is movable (see FIG. 3).

The second support 36 is configured with a pair of panel-shaped brackets provided on a portion of the first support 34 at the transport unit 24 side, and supports the body 40*a* of the delivery unit 40 to be described later. Each of the brackets of the second support 36 has, for example, an inverted L-shape that protrudes from the first support 34 to the transport unit 24 side and is bent to extend toward the surface 14*a* of the table 14 as viewed from the apparatus depth direction.

The third support 38 is configured with a pair of panel-shaped brackets provided on a portion of the first support 34 opposite to the transport unit 24, and supports a case 62 of the cutting unit 60 to be described later.

(Delivery Unit)

The delivery unit 40 is disposed downstream of the transport unit 24 in the transport direction of the filament FB, is supported by the second support 36, and is adapted to juxtapose the filaments FB transported from the transport unit 24 in the direction along the surface 14a to form the parallel filament FA and deliver the same to the surface 14a. The delivery unit 40 includes the body 40a and a heating unit 42.

Figure 2:
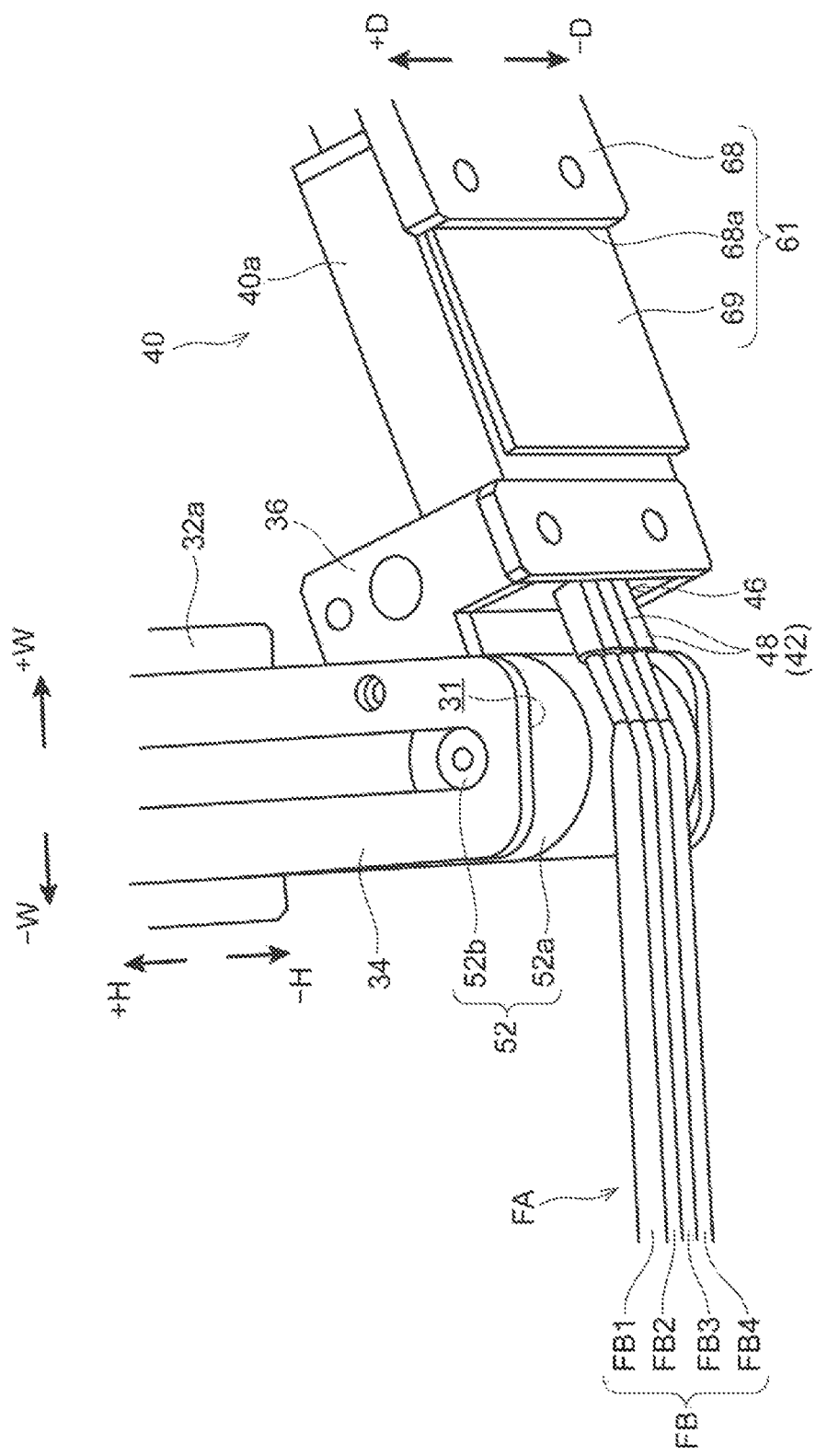
FIG. 2 is a perspective view illustrating a state where a delivery unit according to the exemplary embodiment is viewed from below.

As illustrated in FIGS. 1 and 2, the body 40a is a rectangular parallelepiped member that extends in the transport direction of the filament FB as viewed from the apparatus depth direction. The body 40a has a receiving port 44 and a delivery port 46.

As illustrated in FIG. 1, the receiving port 44 is provided on an end of the body 40a at the transport unit 24 side, and is adapted to receive the four filaments FB transported from the transport unit 24 into the body 40a. The delivery port 46 is provided on the opposite end of the body 40a to the transport unit 24, and is adapted to deliver the four filaments FB received from the receiving port 44 toward the surface 14a of the table 14 in a state where the filaments FB are juxtaposed in the apparatus depth direction. In the exemplary embodiment, the delivery direction of the filament FB delivered from the delivery port 46 follows the transport direction of the transport unit 24. That is, the delivery direction of the filament FB delivered from the delivery port 46 is inclined with respect to the surface 14a.

(Heating Unit)

The heating unit 42 is adapted to heat the filament FB delivered from the delivery port 46. In the exemplary embodiment, as illustrated in FIG. 2, the heating unit 42 includes four cylinders 48 and a heating device such as a heater (not illustrated).

Each of the four cylinders 48 is a tubular member that extends from the delivery port 46 along the delivery direction of the filament FB and is formed of a metal material, and the respective cylinders 48 are arranged side by side in the apparatus depth direction. The filament FB delivered from the delivery port 46 passes through the inside of each of the four cylinders 48. The four cylinders 48 are heated by a heating device (not illustrated), thereby heating and melting the filaments FB passing through the inside thereof. The inside of the cylinder 48 is an example of a heated region. The filament FB in the molten state has adhesiveness to the surface 14a of the table 14. Further, as illustrated in FIG. 1, the four filaments FB which are in the molten state by being heated with the four cylinders 48 are delivered as the parallel filament FA from the cylinders 48 onto the surface 14a. That is, the delivery unit 40 delivers the parallel filament FA including the four filaments FB. The parallel filament FA in the molten state which have been delivered from the delivery unit 40 onto the surface 14a are adhered onto the surface 14a.

In the exemplary embodiment, the filaments FB delivered from the delivery unit 40 are distinguished as filaments FB1, FB2, FB3, and FB4 in order from the front side (see FIGS. 2 and 8).

(Pressurizing Unit)

As illustrated in FIG. 1, the pressurizing unit 50 is disposed downstream of the delivery unit 40 in the delivery direction of the filament FB, is supported by the first support 34, and is adapted to pressurize the parallel filament delivered onto the surface 14a of the table 14. In the exemplary embodiment, the pressurizing unit 50 includes a roller portion 52.

The roller portion 52 is a columnar roller member that is disposed in a posture with the apparatus depth direction as the axial direction. The roller portion 52 has a columnar body 52a and the shaft 52b that passes through the central axis of the body 52a and extends in the apparatus depth direction. The roller portion 52 is disposed such that the parallel filament FA delivered onto the surface 14a are sandwiched between the outer peripheral surface of the body 52a and the surface 14a of the table 14.

The roller portion 52 is rotatably supported in a state where the shaft 52b passes through the hole 35 of the first support 34. The shaft 52b of the roller portion 52 is connected to an elevating unit (not illustrated). The elevating unit (not illustrated) is configured with, for example, a hydraulic cylinder, and applies a translational force in the apparatus vertical direction to the shaft 52b so as to move the shaft 52b in the apparatus vertical direction inside the hole 35 of the first support 34. At this time, the roller portion 52 moves together with the shaft 52b. Further, when the roller portion 52 and the table 14 sandwich the parallel filament FA in the molten state which have been delivered onto the surface 14a, the roller portion 52 presses the parallel filament FA in the molten state upon receiving a downward translational force applied to the roller portion 52 by the elevating unit (not illustrated). That is, the roller portion 52 pressurizes the filaments FB which have been delivered to the surface 14a to form the parallel filament FA against the surface 14a. The roller portion 52 pressurizes the parallel filament FA in the molten state to form a layer of the parallel filament FA. The operation of the elevating unit (not illustrated) is controlled by the controller 16.

Figure 3:
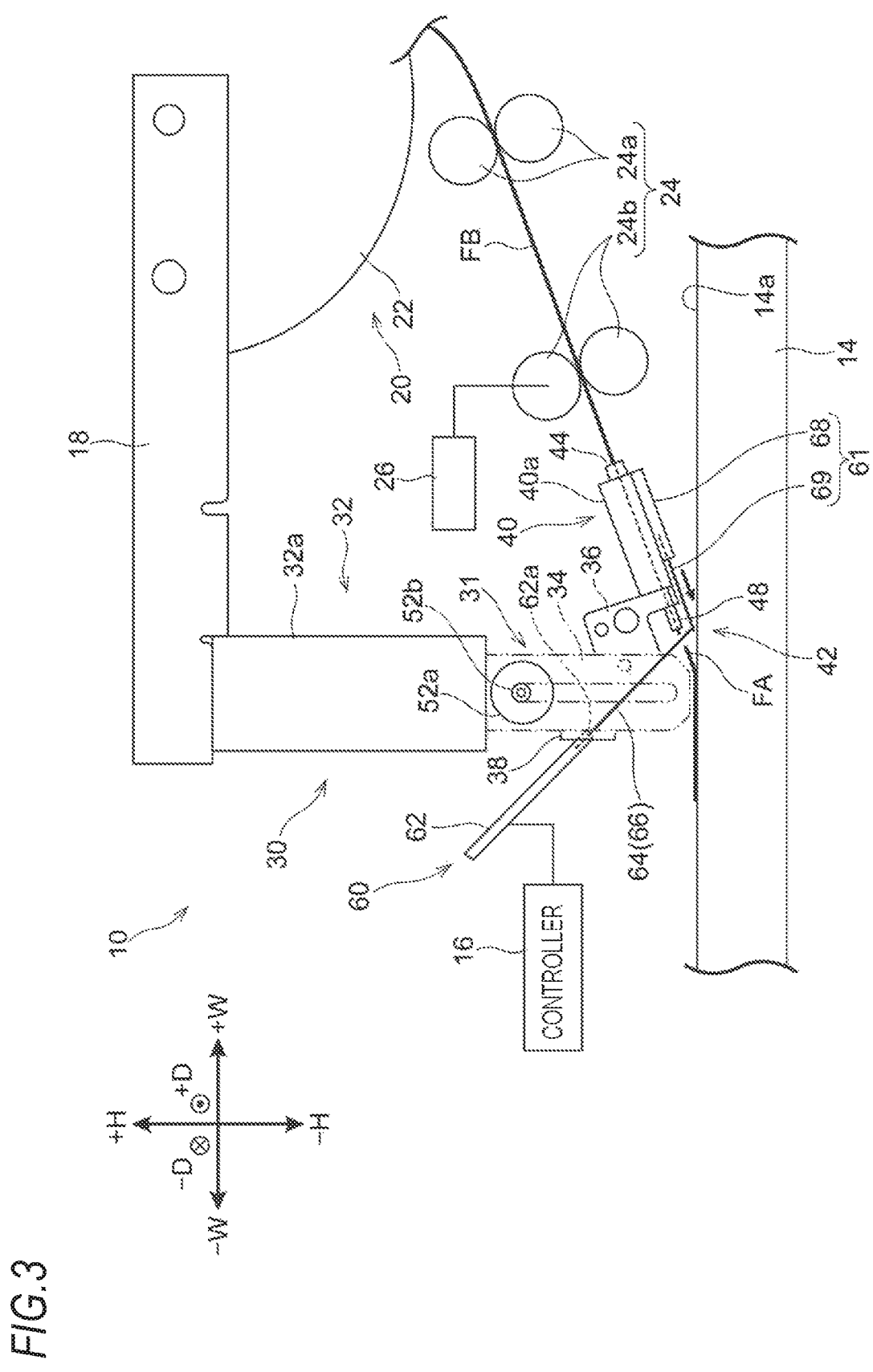
FIG. 3 is a schematic side view illustrating an operation in which a cutting unit of the manufacturing apparatus according to the exemplary embodiment cuts a filament.

As illustrated in FIG. 3, when the shaft 52b is moved to the upper end of the hole 35 of the first support 34 by the elevating unit (not illustrated), the roller portion 52 rises together with the shaft 52b to open the passage space 31 of the support 34 with respect to the cutting unit 60.

(Cutting Unit)

As illustrated in FIG. 1, the cutting unit 60 is adapted to cut the filaments FB which have been delivered from the delivery unit 40 to form the parallel filament FA between the pressurizing unit 50 and the heating unit 42 in the delivery direction of the filament FB. The cutting unit 60 includes the case 62, an individually cutting unit 66, a collectively cutting unit 64, and a receiving unit 61.

The case 62 is a member having a rectangular parallelepiped external shape that extends along the intersecting direction that intersects the delivery direction of the parallel filament FA and along the apparatus depth direction. The intersecting direction in the exemplary embodiment is a direction inclined toward the −W side and the +H side with respect to the surface 14a of the table 14. The lower end of the case 62 is supported by the third support 38. The case 62 has a hollow structure in which the inside of the case 62 penetrates in the intersecting direction. That is, an opening 62a is formed in the lower end surface of the case 62 in the intersecting direction. The case 62 and the opening 62a are sized to be able to accommodate therein the individually cutting unit 66 and the collectively cutting unit 64 to be described later. The hollow structure of the case 62 may be a structure in which the upper end of the case in the intersecting direction is closed.

(Individually Cutting Unit)

Figure 5A:
FIG. 5A is a front view of an individually cutting unit and a collectively cutting unit according to the exemplary embodiment.
Figure 5A:
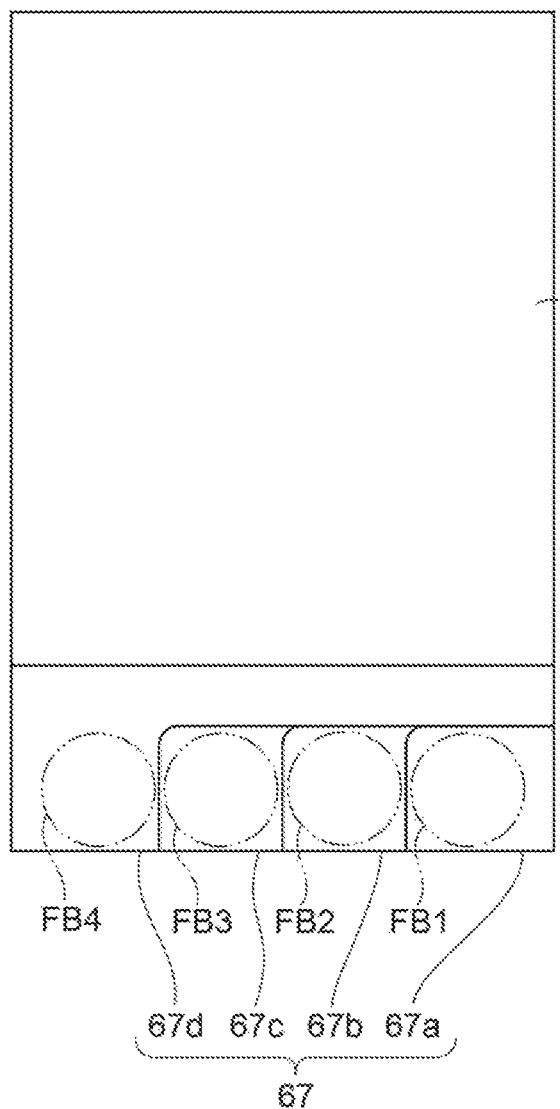
Figure 5B:
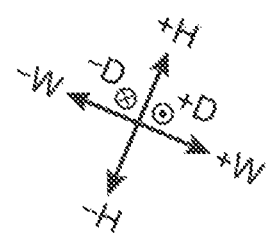
FIG. 5B is a side view of the individually cutting unit and the collectively cutting unit according to the exemplary embodiment.
Figure 5B:
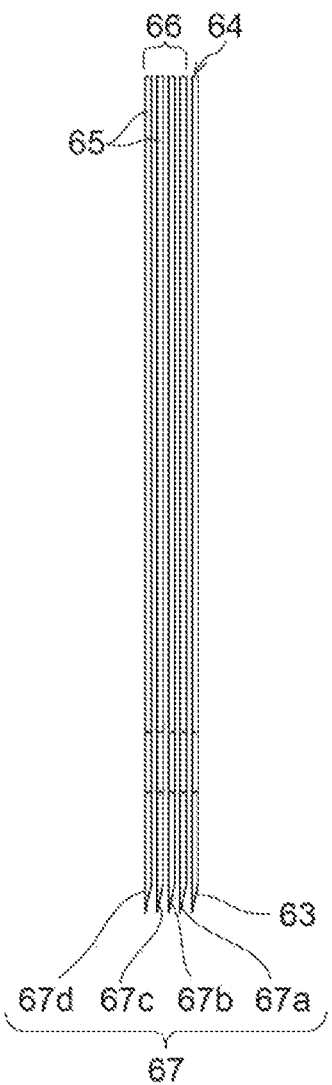

The individually cutting unit 66 is adapted to individually cut the four filaments FB forming the parallel filament FA. As illustrated in FIGS. 5A and 5B, the individually cutting unit 66 includes four slide plates 65 and four individual pressing blades 67.

The slide plate 65 is a thin plate-shaped member that extends along the intersecting direction and the apparatus depth direction.

Each of the four individual pressing blades 67 is a rectangular plate-shaped flat blade that protrudes downward in the intersecting direction from a portion of the lower end in the intersecting direction of a corresponding one of the four slide plates 65. Specifically, as illustrated in FIGS. 6A to 6D, each of the four individual pressing blades 67 corresponds to one of the filaments FB1, FB2, FB3, and FB4 and protrudes from a portion of the lower end in the intersecting direction of a corresponding one of the slide plates 65. That is, the four individual pressing blades 67 protrude from the portions of the lower ends of the respective slide plates 65 which are shifted from each other along the juxtaposition direction of the parallel filament FA. The individual pressing blades 67 corresponding to the respective filaments FB1, FB2, FB3, and FB4 are sequentially distinguished as individual pressing blades 67a, 67b, 67c and 67d. When the four slide plates 65 of the individually cutting unit 66 are arranged in the plate thickness direction such that plate surfaces thereof overlap with each other, the individual pressing blades 67a to 67d are arranged side by side in the apparatus depth direction as viewed in the plate thickness direction as illustrated in FIG. 5A.

The individually cutting unit 66 is accommodated inside the case 62 in a state where the respective slide plates 65 overlap each other in the plate thickness direction (see FIG. 1). The individually cutting unit 66 is illustrated in a simplified manner, that is, illustrated as a single plate in FIGS. 1 and 3.

The individually cutting unit 66 is connected to a slide unit (not illustrated) that slides the individually cutting unit 66 in the intersecting direction, and is configured to be able to be taken into and out from the opening 62a in the case 62 by the slide unit (not illustrated). The slide unit (not illustrated) is configured with, for example, plural linear actuators, and is able to individually slide the individual pressing blades 67a to 67d of the individually cutting unit 66. Further, the slide unit (not illustrated) is also connected to the collectively cutting unit 64 to be described later, and is able to separately slide the individually cutting unit 66 and the collectively cutting unit 64. As illustrated in FIG. 3, when the passage space 31 of the first support 34 is open, the individually cutting unit 66 is able to come into contact with the plate surface of a plate 69 (details of which will be described later) of the receiving unit 61 which protrudes to a position downstream of the cylinder 48 in the delivery direction by the slide unit (not illustrated). The position where the individually cutting unit 66 and the plate 69 come into contact with each other is a position between the pressurizing unit 50 and the heating unit 42 of the delivery unit 40 in the apparatus width direction. In other words, the position where the individually cutting unit 66 and the plate 69 come into contact with each other is a position between the pressurizing unit 50 and the heating unit 42 in the delivery direction of the filament FB.

As any one of the individual pressing blades 67a to 67d of the individually cutting unit 66 slides toward the plate 69 in the intersecting direction when the filament FB is present between the individually cutting unit 66 and the plate 69, each of the individual pressing blades 67a to 67d cuts a corresponding one of the filaments FB1 to FB4. Specifically, the individual pressing blades 67a to 67d are slid by the slide unit (not illustrated) to press the respective corresponding filaments FB1 to FB4 toward the receiving unit 61, thereby cutting the filaments FB1 to FB4. That is, the individually cutting unit 66 cuts the filament FB between the pressurizing unit 50 and the heating unit 42 in the delivery direction of the filament FB. When the individually cutting unit 66 cuts the filament FB, the transport unit 24 stops the transport of the filament FB. Further, the resin of the cut filament FB cut at this time is in the molten state by heating of the heating unit 42.

(Collectively Cutting Unit)

The collectively cutting unit 64 is adapted to collectively cut the four filaments FB forming the parallel filament FA. As illustrated in FIGS. 5A and 5B, the collectively cutting unit 64 includes one slide plate 65 which is the same as in the individually cutting unit 66 and one pressing blade 63.

Figure 6A:
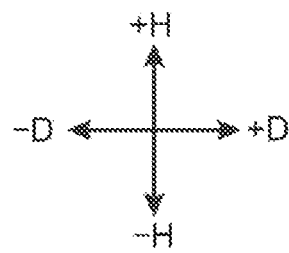
FIGS. 6A to 6E are front views of plural pressing blades according to the exemplary embodiment.
Figure 6A:
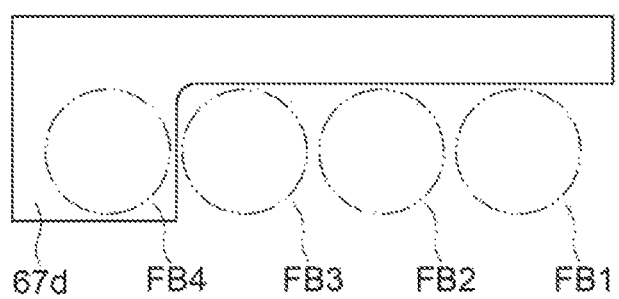
Figure 6B:
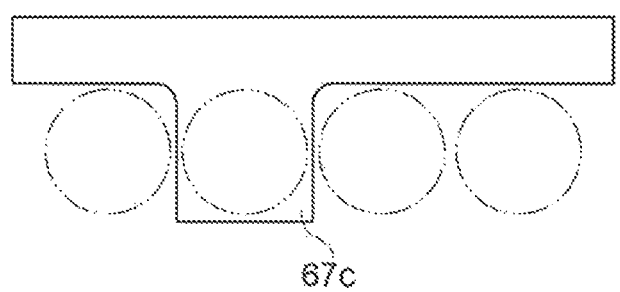
Figure 6C:
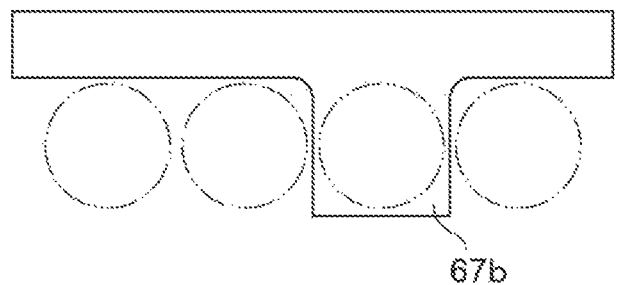
Figure 6D:
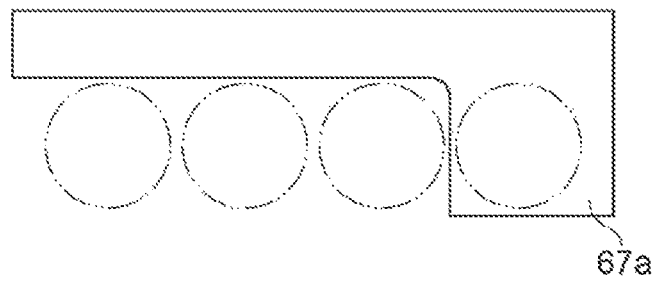
Figure 6E:
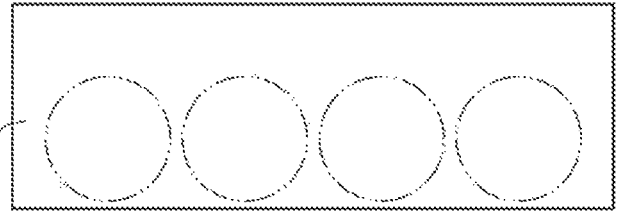

As illustrated in FIGS. 5A and 5B and FIG. 6E, the pressing blade 63 is a rectangular plate-shaped flat blade having a sharp portion at the lower end thereof that protrudes from the lower end in the intersecting direction of the slide plate 65 along the edge in the apparatus depth direction of the slide plate 65. In other words, the pressing blade 63 is shaped to overlap with the individual pressing blades 67a to 67d as viewed in the plate thickness direction. The width of the pressing blade 63 in the apparatus depth direction is greater than the width of the parallel filament FA in the apparatus depth direction.

As illustrated in FIGS. 5A and 5B, the collectively cutting unit 64 is accommodated inside the case 62 together with the individually cutting unit 66 in a state of overlapping with the individually cutting unit 66 in the plate thickness direction (see FIG. 1). The collectively cutting unit 64 and the individually cutting unit 66 open the passage space 31 of the first support 34 with respect to the pressurizing unit 50 when accommodated inside the case 62. The individually cutting unit 66 and the collectively cutting unit 64 are illustrated in a simplified manner, that is, illustrated as a single plate in FIGS. 1 and 3.

As described above, the collectively cutting unit 64 is connected to the sliding unit (not illustrated), and is configured so as to be taken into and out from the opening 62a in the case 62 by the slide unit (not illustrated). As illustrated in FIG. 3, when the passage space 31 of the first support 34 is open, the collectively cutting unit 64 is able to come into contact with the plate surface of the plate 69 which protrudes to a position downstream of the cylinder 48 in the delivery direction by the slide unit (not illustrated). The position where the collectively cutting unit 64 and the plate 69 come into contact with each other is a position between the pressurizing unit 50 and the heating unit 42 of the delivery unit 40 in the apparatus width direction. In other words, the position where the collectively cutting unit 64 and the plate 69 come into contact with each other is a position between the pressurizing unit 50 and the heating unit 42 in the delivery direction of the filament FB.

As the collectively cutting unit 64 is slid toward the plate 69 by the slide unit (not illustrated) in the intersecting direction when the filament FB is present between the collectively cutting unit 64 and the plate 69, the collectively cutting unit 64 cuts the filaments FB. Specifically, the collectively cutting unit 64 collectively cuts the filaments FB1 to FB4 in the juxtaposition state by pressing the filaments FB1 to FB4 juxtaposed in the apparatus depth direction toward the receiving unit 61 with the pressing blade 63. That is, the collectively cutting unit 64 collectively cuts the four filaments FB forming the parallel filament FA. At this time, the positions of respective cut ends E of the four filaments cut by the collectively cutting unit 64 are side by side in the apparatus depth direction. Further, the collectively cutting unit 64 cuts the filament FB between the pressurizing unit 50 and the heating unit 42 in the delivery direction of the filament FB. When the collectively cutting unit 64 cuts the filaments FB, the transport unit 24 stops the transport of the filaments FB. Further, the filaments FB cut at this time are in the molten state by heating of the heating unit 42.

(Receiving Unit)

As illustrated in FIGS. 1 and 2, the receiving unit 61 is provided on a portion of the delivery unit 40 below the cylinder 48 in the intersecting direction, and includes a case 68 and the plate 69.

The case 68 is a member having a rectangular parallelepiped external shape that extends along the delivery direction of the filament FB and along the apparatus depth direction, and is disposed on a portion of the delivery unit 40 below the cylinder 48 in the intersecting direction. The case 68 has a hollow structure in which the inside of the case 68 penetrates in the delivery direction. That is, an opening 68a is formed in the downstream end surface of the case 68 in the delivery direction. The case 68 and the opening 68a are sized to be able to accommodate therein the plate 69 to be described later. The hollow structure of the case 68 may be a structure in which the upstream end of the case in the delivery direction is closed.

The plate 69 is a plate-shaped member that extends along the delivery direction of the filament FB and along the apparatus depth direction. The plate 69 is disposed such that the downstream distal end of the plate 69 in the delivery direction of the filament FB is located upstream of the cylinder 48 of the delivery unit 40 in the delivery direction when the delivery unit 40 delivers the parallel filament FA.

The plate 69 of the receiving unit 61 is connected to a reciprocating unit (not illustrated) that reciprocates the plate 69 in the delivery direction of the filament FB, and is configured to be able to be taken into and out from the opening 68a in the case 68 by the reciprocating unit (not illustrated). The reciprocating unit (not illustrated) is configured with, for example, a hydraulic cylinder. The plate 69 is able to protrude to a position downstream of the cylinder 48 in the delivery direction of the filament FB by the reciprocating unit (not illustrated) when the pressurizing unit 50 opens the passage space 31 of the first support 34.

The operations of the reciprocating unit for the receiving unit 61 and the slide unit (not illustrated) for the individually cutting unit 66 and the collectively cutting unit 64 are controlled by the controller 16. That is, the operation of the cutting unit 60 is controlled by the controller 16.

(Manufacturing Method)

Next, an example of a manufacturing process according to the exemplary embodiment will be described with reference to FIGS. 1, 3, 4, and 7.

First, as illustrated in FIG. 1, the controller 16 controls the operations of the stacking unit 30 and the moving device 18 according to manufacturing process data of a three-dimensional object to be manufactured, thereby delivering the parallel filament FA from the delivery unit 40 toward the surface 14a. The parallel filament FA delivered onto the surface 14a are pressurized by the pressurizing unit 50 whose operation is controlled by the controller 16, becoming a layer of the parallel filament FA.

Figure 7:
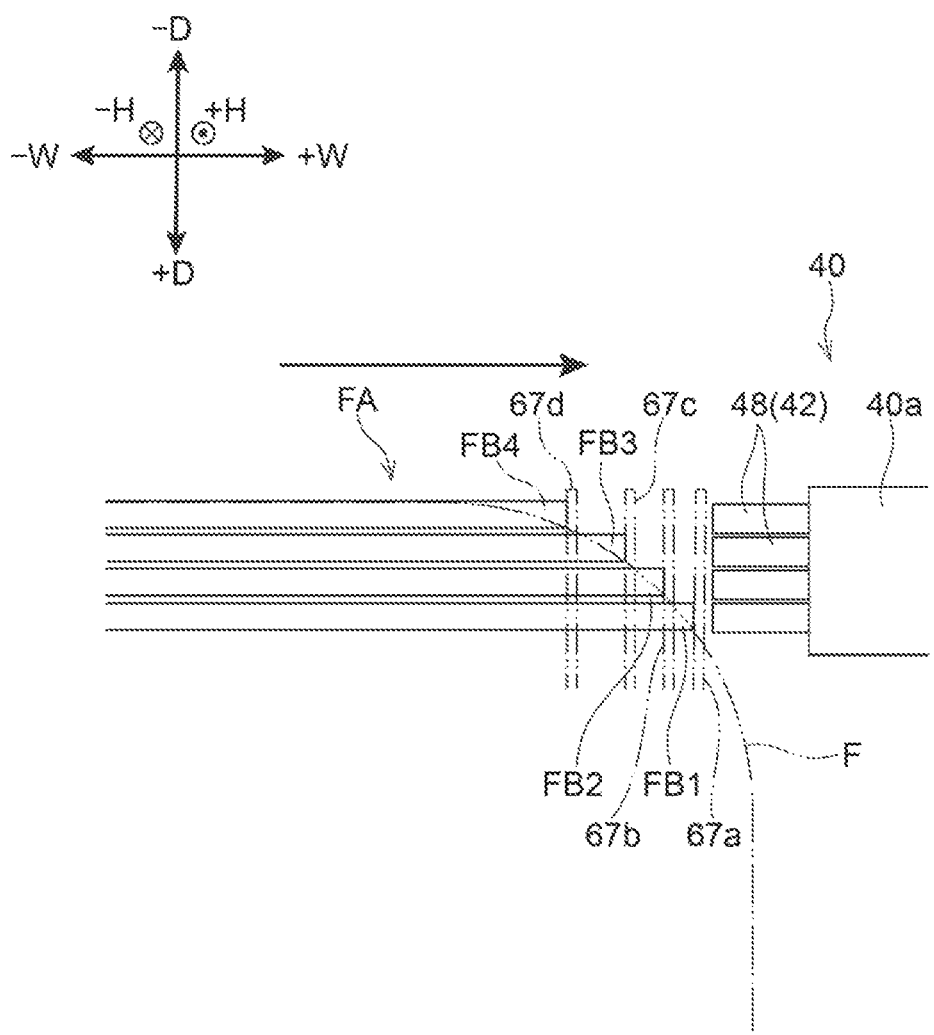
FIG. 7 is a plan view illustrating an operation in which the cutting unit of the manufacturing apparatus according to the exemplary embodiment cuts parallel filament.

As illustrated in FIG. 7, it is considered a case where manufacturing process data of an object to be manufactured having a fillet portion F that is a portion with rounded corners includes cutting of the parallel filament FA at the fillet portion F. At this time, the controller 16 controls the cutting unit 60 to individually cut the filaments FB forming the parallel filament FA. Specifically, the controller 16 causes the individually cutting unit 66 to individually cut the filaments FB in the order of the filaments FB4, FB3, FB2, and FB1 so that the layer formed on the surface 14a according to the manufacturing process data fits the shape of a layer based on the manufacturing process data.

More specifically, when the individually cutting unit 66 cuts the filaments FB1 to FB4 individually, as illustrated in FIG. 3, the controller 16 temporarily stops the operations of the moving device 18 and the drive unit 26 of the transport unit 24. Then, the controller 16 controls the elevating unit (not illustrated) of the pressurizing unit 50 to raise the roller portion 52 and open the passage space 31 of the first support 34 with respect to the cutting unit 60. Furthermore, the controller 16 controls the cutting unit 60 to protrude the plate 69, and then sequentially slides the individual pressing blades 67d, 67c, 67b, and 67a in the order of the filaments FB4 to FB1 to be cut, thereby cutting the filaments FB (see FIG. 7). At this time, the controller 16 controls the moving device 18 and the transport unit 24 to sequentially adjust the cutting positions of the filaments FB4 to FB1 so that the filaments FB4 to FB1 delivered to the surface 14a after cutting fit the shape of the fillet portion F.

After cutting any one of the filaments FB1 to FB4, the controller 16 controls the cutting unit 60 to allow the individually cutting unit 66 to be accommodated inside the case 62 and open the passage space 31 with respect to the pressurizing unit. Thereafter, the controller 16 controls the elevating unit (not illustrated) of the pressurizing unit 50 to lower the roller portion 52 and press the filaments FB1 to FB4 delivered onto the surface 14a. As the filaments FB1 to FB4 delivered onto the surface 14a are pressurized, the filaments FB1 to FB4 widen in the juxtaposition direction of the parallel filament FA and gaps between the filaments FB1 to FB4 disappear, whereby a layer of the parallel filament FA is formed.

Figure 4:
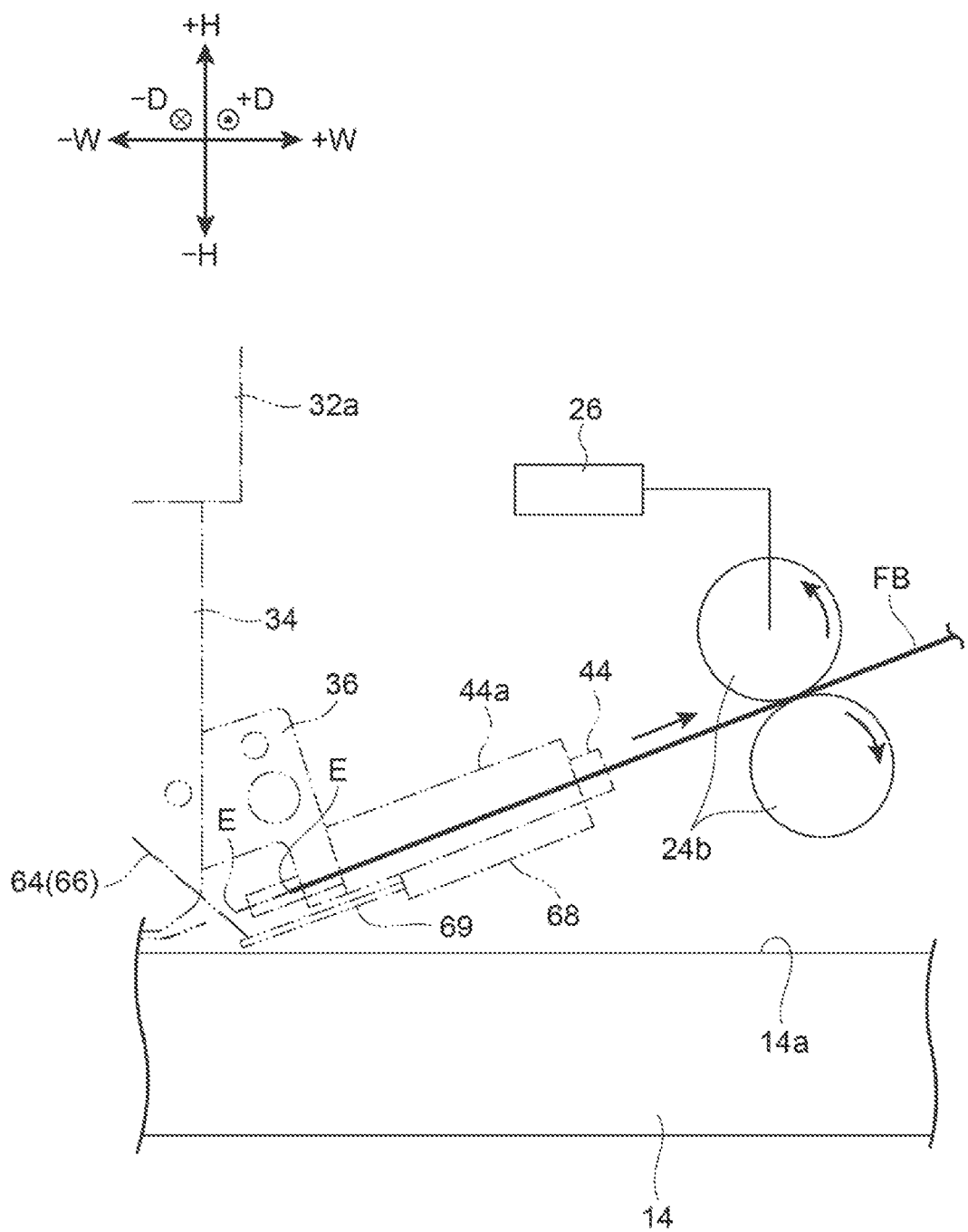
FIG. 4 is a schematic side view illustrating an operation in which transport rollers of the manufacturing apparatus according to the exemplary embodiment pull the filament back.

Further, after cutting any one of the filaments FB1 to FB4, as illustrated in FIG. 4, the controller 16 controls the respective drive units 26 corresponding to the cut filaments FB to rotate the upper roller member of each downstream transport roller pair 24b counterclockwise as viewed from the front side. Thus, the cut filaments FB1 to FB4, that is, the filaments FB1 to FB4 sandwiched by the downstream transport roller pairs 24b are pulled back in the direction opposite to the delivery direction of the filament FB. At this time, the drive units 26 pull the cut ends E of the cut filaments FB1 to FB4 back to the inside of the cylinders 48 of the heating unit 42. That is, the drive units 26 pull the cut ends E of the cut filaments FB1 to FB4 back to the heated region where the heating unit 42 heats. The drive unit 26 is an example of a pullback unit. The cut ends E of the filaments FB1 to FB4 which have been pulled back to the heated region are reheated by the heating unit 42.

In the manufacturing apparatus 10 of the exemplary embodiment, for example, when manufacturing an object having an edge shaped to follow the apparatus depth direction, the controller 16 may collectively cut the four filaments FB by the collectively cutting unit 64. More specifically, at this time, the controller 16 temporarily stops the moving device 18 and the transport unit 24 and opens the passage space 31 of the first support 34 with respect to the cutting unit 60, and then slides the collectively cutting unit 64 to collectively cut the filaments FB1 to FB4.

<Action and Effect>

Next, actions and effects according to the exemplary embodiment of the present disclosure will be described. In this description, when describing a comparative exemplary embodiment of the present exemplary embodiment, reference numerals and names of the same components as those of the manufacturing apparatus 10 of the exemplary embodiment will be used as they are.

The manufacturing apparatus 10 of the exemplary embodiment includes the cutting unit 60 that cuts the filament FB between the pressurizing unit 50 and the heating unit 42 in the delivery direction of the filament FB. The manufacturing apparatus 10 of the exemplary embodiment is compared with a manufacturing apparatus of a comparative exemplary embodiment described below.

In the manufacturing apparatus of the comparative exemplary embodiment, the cutting unit is disposed upstream of the delivery unit 40 in the delivery direction of the filament FB. The manufacturing apparatus of the comparative exemplary embodiment has the same configuration as the manufacturing apparatus 10 of the exemplary embodiment except for the above point.

The distance between the pressurizing unit 50 and the cutting point of the filament FB by the cutting unit 60 in the delivery direction of the filament FB in the manufacturing apparatus of the comparative exemplary embodiment is greater than the distance in the manufacturing apparatus 10 of the exemplary embodiment. In other words, the distance at which the cut filament FB is delivered from the delivery unit 40 to the surface 14*a* of the table 14 in a state of being not stretched is greater than the distance in the manufacturing apparatus 10 of the exemplary embodiment. Therefore, the dimensional accuracy of an object manufactured by the manufacturing apparatus of the comparative exemplary embodiment is likely to be worse than the dimensional accuracy of an object manufactured by the manufacturing apparatus 10 of the exemplary embodiment. In other words, the manufacturing apparatus 10 of the exemplary embodiment has a shorter distance between the pressurizing unit 50 and the cutting point of the filament FB by the cutting unit 60 in the delivery direction of the filament FB than the comparative exemplary embodiment, thus being capable of improving the dimensional accuracy of a manufactured object as compared with the comparative exemplary embodiment. Accordingly, the manufacturing apparatus 10 of the exemplary embodiment achieves an improvement in the dimensional accuracy of a manufactured object as compared with the configuration in which the filament is cut upstream of the heating unit in the delivery direction of the filament.

Further, the manufacturing apparatus 10 of the exemplary embodiment has a configuration in which the heating unit 42 of the delivery unit 40 includes the cylinder 48 provided at the delivery port 46 side. In the configuration in which the heating unit 42 includes the cylinder 48, when the filament FB is cut upstream of the heating unit 42 in the delivery direction of the filament FB, there will occur the work of repeatedly passing the filament FB through the inside of the cylinder 48 when the filament FB is re-delivered from the delivery unit 40 after cutting. Meanwhile, since the manufacturing apparatus 10 of the exemplary embodiment cuts the filament FB between the pressurizing unit 50 and the heating unit 42 in the delivery direction of the filament FB, when the filament FB is re-delivered, there will occur no work of repeatedly passing the filament FB through the inside of the cylinder 48. Accordingly, the manufacturing apparatus 10 of the exemplary embodiment achieves an improvement in workability when re-delivering the filament from the delivery unit 40 after cutting of the filament in the configuration in which the heating unit 42 includes the cylinder 48 as compared with a configuration in which the filament is cut upstream of the heating unit 42 in the delivery direction.

Further, in the manufacturing apparatus 10 of the exemplary embodiment, the drive unit 26 is configured to pull the cut end E of the filament FB back to the inside of the heating unit 42. Accordingly, the manufacturing apparatus 10 of the exemplary embodiment achieves an improvement in workability when re-delivering the filament FB from the delivery unit 40 after cutting of the filament FB as compared with a configuration in which the cut end E of the filament FB is pulled back to the upstream side of the heating unit 42 in the delivery direction.

Further, in the manufacturing apparatus 10 of the exemplary embodiment, the drive unit 26 is configured to pull the cut end E of the filament FB back to the heated region where the heating unit 42 heats. When the filament FB is re-delivered as it is after cutting of the filament FB, the cut end E may be cooled to a semi-cured state prior to re-delivery, which may deteriorate adhesiveness of the re-delivered filament FB. Meanwhile, in the manufacturing apparatus 10 of the exemplary embodiment, since the cut end E of the filament FB is pulled back by the drive unit 26 to the inside of the cylinder 48 which is the heated region where the heating unit 42 heats, the pulled-back cut end E is reheated in the cylinder 48 and is re-delivered in the molten state from the delivery unit 40. Accordingly, the manufacturing apparatus 10 of the exemplary embodiment achieves an improvement in the adhesiveness of the re-delivered filament FB as compared with a configuration in which the filament FB is re-delivered as it is after cutting of the filament FB.

Further, in the manufacturing apparatus 10 of the exemplary embodiment, the cutting unit 60 includes the individually cutting unit 66. Accordingly, the manufacturing apparatus 10 of the exemplary embodiment may achieve an improvement in the dimensional accuracy of a manufactured object as compared with a configuration in which the cutting unit simply includes the collectively cutting unit 64.

Further, the manufacturing apparatus 10 of the exemplary embodiment includes the controller 16 that controls the cutting unit 60 to individually cut the four filaments FB1 to FB4 according to manufacturing process data of an object to be manufactured. Accordingly, the manufacturing apparatus 10 of the exemplary embodiment achieves an improvement in the dimensional accuracy of an object to be manufactured by the manufacturing apparatus 10.

Further, in the manufacturing apparatus 10 of the exemplary embodiment, the cutting unit 60 includes the individual pressing blades 67*a* to 67*d* and the receiving unit 61. Accordingly, the configuration of the individually cutting unit is simpler than the configuration of individually cutting filaments with plural scissors.

Further, in the manufacturing apparatus 10 of the exemplary embodiment, the cutting unit 60 includes the collectively cutting unit 64. Accordingly, the manufacturing apparatus 10 of the exemplary embodiment may prevent a deviation in the cutting positions of plural filaments as compared with a configuration in which the cutting unit simply includes the individually cutting unit.

As described above, the specific exemplary embodiment of the present disclosure has been described in detail, but the present disclosure is not limited to the above exemplary embodiment, and various alterations, modifications and improvements within the scope of the technical idea of the present disclosure are possible.

For example, in the exemplary embodiment, the drive unit 26 is provided in the transport unit 24. However, the drive unit 26 may not be provided in the transport unit 24. For example, the drive unit may be connected to the reel 22 instead of the transport unit 24. In this case, the drive unit connected to the reel 22 serves as a pullback unit.

Further, the exemplary embodiment has described the manufacturing apparatus 10 as being configured to deliver the parallel filament FA including the four filaments FB as a manufacturing material. However, the manufacturing material according to the exemplary embodiment of the present disclosure is not limited to the parallel filament FA. For example, the manufacturing material according to the exemplary embodiment of the present disclosure may be one filament FB. Further, the number of filaments FB forming the parallel filament FA according to the exemplary embodiment of the present disclosure may be two, three, or five or more.

Further, in the exemplary embodiment, the heating unit 42 includes the four cylinders 48 through which the respective filaments FB pass. However, the heating unit 42 is not limited to include four cylinders. For example, the heating unit 42 may include one cylinder that is flattened along the juxtaposition direction of the parallel filament FA and allows plural filaments FB to pass therethrough. Further, the heating unit 42 may be configured to heat the parallel filament FA with a pair of plate-shaped members sandwiching the parallel filament FA therebetween. Further, the heating unit 42 may be configured to heat the filaments FB in a non-contact state.

Further, in the exemplary embodiment, the drive unit 26 can rotate the upper roller member of the downstream transport roller pair 24b counterclockwise as viewed from the front side. However, the drive unit 26 may be configured to be not able to rotate the upper roller member counterclockwise as viewed from the front side. Further, the manufacturing apparatus according to the exemplary embodiment of the present disclosure may be configured to have no pullback unit.

Further, in the exemplary embodiment, the cut end E of the cut filament FB is pulled back to the inside of the cylinder 48 of the heating unit 42. However, in the exemplary embodiment of the present disclosure, the cut end E may not be pulled back to the inside of the cylinder 48 of the heating unit 42. For example, the cut end E may be pulled back to the upstream side of the heating unit 42 in the delivery direction of the filament FB.

Further, in the exemplary embodiment, the individually cutting unit 66 includes the individual pressing blades 67a to 67d. However, the individually cutting unit 66 is not limited to include the individual pressing blades 67a to 67d. For example, the individually cutting unit 66 may be configured to individually cut the filaments with plural scissors.

Further, the exemplary embodiment has described the pressing blade 63 of the collectively cutting unit 64 as being a rectangular plate-shaped flat blade. However, the collectively cutting unit according to the exemplary embodiment of the present disclosure is not limited to a rectangular plate shape as long as the positions of the respective cut ends of plural filaments cut by the collectively cutting unit may be arranged in the direction (juxtaposition direction) orthogonal to the filament transport direction. For example, when the cross-sectional direction of the filament is the apparatus width direction, the collectively cutting unit may be a plate-shaped member that extends along the apparatus height direction and the apparatus depth direction as viewed from the apparatus width direction and that has a blade on the lower end thereof which is inclined in the apparatus depth direction with respect to the apparatus height direction.

Further, in the exemplary embodiment, the manufacturing apparatus 10 includes both the individually cutting unit 66 and the collectively cutting unit 64. Alternatively, the manufacturing apparatus according to the exemplary embodiment of the present disclosure may simply include the individually cutting unit, or may simply include the collectively cutting unit.

Further, in the exemplary embodiment, the manufacturing material is formed by impregnating a fiber bundle with a resin. However, the manufacturing material according to the exemplary embodiment of the present disclosure is not limited to the fiber bundle impregnated with the resin.

Further, the exemplary embodiment has described an example in which the controller 16 controls the cutting unit 60 according to manufacturing process data to individually cut the filaments FB1 to FB4 so that the layer formed on the surface 14a fits the shape of a layer based on the manufacturing process data (see FIG. 7). However, the exemplary embodiment of the present disclosure is not limited thereto. Here, the manufacturing process data is data for forming each layer based on data on an object to be manufactured, and includes at least a part of shape data of each layer and trajectory data (delivery process data) of the parallel filament FA at the time of forming each layer. The above exemplary embodiment has described an example in which the controller 16 controls the cutting positions of the filaments FB1 to FB4 forming the parallel filament FA according to the shape data of each layer so that a stump of the parallel filament FA follows the external shape of the layer. As another example, the manufacturing process data may be, for example, data by which the filaments FB1 to FB4 forming the parallel filament FA are delivered while being curved along the surface 14a to define the external shape of the layer. Further, as yet another example, the manufacturing process data may be, for example, data by which the filaments FB1 to FB4 forming the parallel filament FA on the surface 14a are delivered while being folded back in a zigzag shape to define the external shape of the layer. In the other examples, in order to absorb the difference in length between the inner and outer circumferences of the filaments FB1 to FB4 in the curved portion or in the folded portion, or to relieve the stress of the filament FB on the inner circumferential side, the controller 16 may cut the filaments FB1 to FB4 individually. Further, the other examples are not limited to the mode in which all of the filaments FB1 to FB4 are cut in the curved portion or in the folded portion, and a mode in which only some filaments among the filaments FB1 to FB4 are cut is also possible.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A manufacturing apparatus comprising:
   a table having a surface;
   a delivery assembly including a heater configured to heat a filament and a port configured to deliver the filament toward the surface;
   a roller downstream of the delivery assembly in a delivery direction of the filament, wherein the roller is configured to pressurize the filament against the surface; and
   a blade that cuts the filament at a position along the delivery direction after the filament is heated by the heater and before the roller, wherein
   the delivery assembly delivers parallel filaments toward the surface, the parallel filaments being formed by juxtaposing a plurality of the filaments,
   the blade includes a plurality of blades that individually cut the plurality of the filaments forming the parallel filaments,
   the plurality of blades individually press the plurality of the filaments from one side of the parallel filament in an intersecting direction, and
   a plate is on the other side of the plurality of the filaments in the intersecting direction, the plurality of blades being configured to press the plurality of the filaments against the plate so as to cut the plurality of the filaments.

2. The manufacturing apparatus according to claim 1, wherein
   the heater has a cylindrical shape that heats the filament while passing the filament through an inside of the heater.

3. The manufacturing apparatus according to claim 2, further comprising:
   a roller that pulls a cut end of the filament back to the inside of the heater.

4. The manufacturing apparatus according to claim 1, further comprising:
   a roller that pulls a cut end of the filament back to a heated region where the heater heats.

5. The manufacturing apparatus according to claim 1, further comprising:
   a controller configured to control the plurality of blades to individually cut the plurality of the filaments according to manufacturing process data of an object to be manufactured.

6. The manufacturing apparatus according to claim 1, wherein the blade further includes an additional single blade that collectively cuts the plurality of filaments.

7. The manufacturing apparatus according to claim 2, wherein the blade further includes an additional single blade that collectively cuts the plurality of filaments.

8. The manufacturing apparatus according to claim 3, wherein the blade further includes an additional single blade that collectively cuts the plurality of filaments.

9. The manufacturing apparatus according to claim 4, wherein the blade further includes an additional single blade that collectively cuts the plurality of filaments.

* * * * *